United States Patent
Lin

[11] Patent Number: 5,908,284
[45] Date of Patent: Jun. 1, 1999

[54] MARINE PROPELLER WITH TUBE SHAPE SHOCK ABSORBING MEANS

[76] Inventor: Yeun-Junn Lin, 5F, No. 23, Lane 10, Tian Bao Street, Taichung, Taiwan

[21] Appl. No.: 08/916,406

[22] Filed: Aug. 22, 1997

[51] Int. Cl.⁶ ........................................................ B63H 1/06
[52] U.S. Cl. .................... 416/134 R; 416/135; 416/93 A; 416/169 R; 440/52; 464/74; 464/89
[58] Field of Search ................ 416/134 R, 135, 416/93 A, 93 M, 169 R, 169 C; 440/45, 52; 464/73, 74, 76, 82, 83, 89

[56] References Cited

U.S. PATENT DOCUMENTS

| | | | |
|---|---|---|---|
| 2,548,839 | 4/1951 | Coombes | 464/89 |
| 2,993,544 | 7/1961 | Carlson | 416/134 R |
| 4,566,855 | 1/1986 | Costabile et al. | 416/134 R |
| 4,826,404 | 5/1989 | Zwicky | 416/134 R |
| 5,049,034 | 9/1991 | Cahoon | 416/134 R |

*Primary Examiner*—Christopher Verdier
*Assistant Examiner*—Ninh Nguyen
*Attorney, Agent, or Firm*—Browdy and Neimark

[57] ABSTRACT

A propeller is made up of a propelling unit having a plurality of blades, a driving unit for driving the propelling unit, and a plurality of deformable transmission units located between the propelling unit and the driving unit such that the transmission units are retained in the retaining slots of the propelling unit and the driving unit. The transmission units are tubular in shape and capable of deforming to absorb an impact force exerting on the transmission units in a direction perpendicular to the longitudinal axis of the transmission units, so as to safeguard the structural integrity of the propeller at such time when the propeller in motion is impacted on by a foreign object.

9 Claims, 4 Drawing Sheets

MARINE PROPELLER WITH TUBE SHAPE SHOCK ABSORBING MEANS

FIELD OF THE INVENTION

The present invention relates generally to a boat propelling system, and more particularly to a propeller intended for use in conjunction with the boat propelling system.

BACKGROUND OF THE INVENTION

The U.S. Pat. No. 4,566,855 discloses a propeller consisting of a propelling unit having a plurality of helical blades serving to propel the craft by the backward thrust of water, a driving unit driven by the engine, and a rubber sleeve located between the driving unit and the propelling unit. The connecting portions of the propelling unit, the sleeve, and the driving unit are provided respectively with a plurality of elongate projections or retaining slots enabling the output torsion of the engine to cause the propelling unit to rotate via the driving unit and the sleeve, so as to generate the backward thrust of water to propel the boat.

The elastic sleeve is capable of absorbing partially the impact force generated instantly by the helical blades upon being impacted on by a foreign object present in water, thereby mitigating the destructive effect of the impact force on the blades and the engine drive shaft.

Such a prior art propeller as described above is defective in design in that the elastic sleeve is rather expensive, and that the elastic sleeve of a high quality is hard to come by, and further that the shock-absorbing effectiveness of the elastic sleeve depends greatly on the rigidity of the sleeve. For example, if the sleeve is insufficiently rigid, the propelling unit can not be effectively actuated to rotate. On the contrary, if the sleeve is excessively rigid, the shock-absorbing capability of the sleeve is greatly undermined.

Another U.S. Pat. No. 4,826,404 discloses a propeller consisting of a propelling unit and the driving unit, which are provided respectively with a plurality of rod-shaped elastic members capable of mitigating an impact force exerting on the blades and capable of being destroyed to cause the propelling unit and the driving unit to idle, so as to protect the propeller blades and the engine driving the propeller blades. However, the destruction of the elastic members can result in the incapacitating of the boat. Moreover, the job of replacing the destroyed elastic member can not be done by an amateur without a professional assistance.

SUMMARY OF THE INVENTION

It is therefore the primary objective of the present invention to provide an improved propeller having a transmission unit capable of absorbing or lessening an impact force exerting by a foreign object on the propeller in motion, so as to protect the structural integrity of the propeller blades without causing the engine power interruption.

It is another objective of the present invention to provide a propeller with a transmission unit capable of absorbing an impact force exerting by a foreign object on the propeller in a form-changing manner.

In keeping with the principle of the present invention, the foregoing objectives of the present invention are attained by a propeller consisting of a propelling unit, a driving unit, and transmission units. The propelling unit and the driving unit are provided in the inner and the outer edges of the adjoining areas thereof with a plurality of retaining slots for retaining the transmission units capable of transmitting the output torsion of engine from the driving unit to the propelling unit. The transmission units are tubular in shape and are capable of deforming to absorb an impact force.

The foregoing objective, features, functions and advantages of the present invention will be more readily understood upon a thoughtful deliberation of the following detailed description of the embodiments of the present invention with reference to the accompanying drawings.

DETAILED DESCRIPTION OF THE INVENTION

Figure 1:
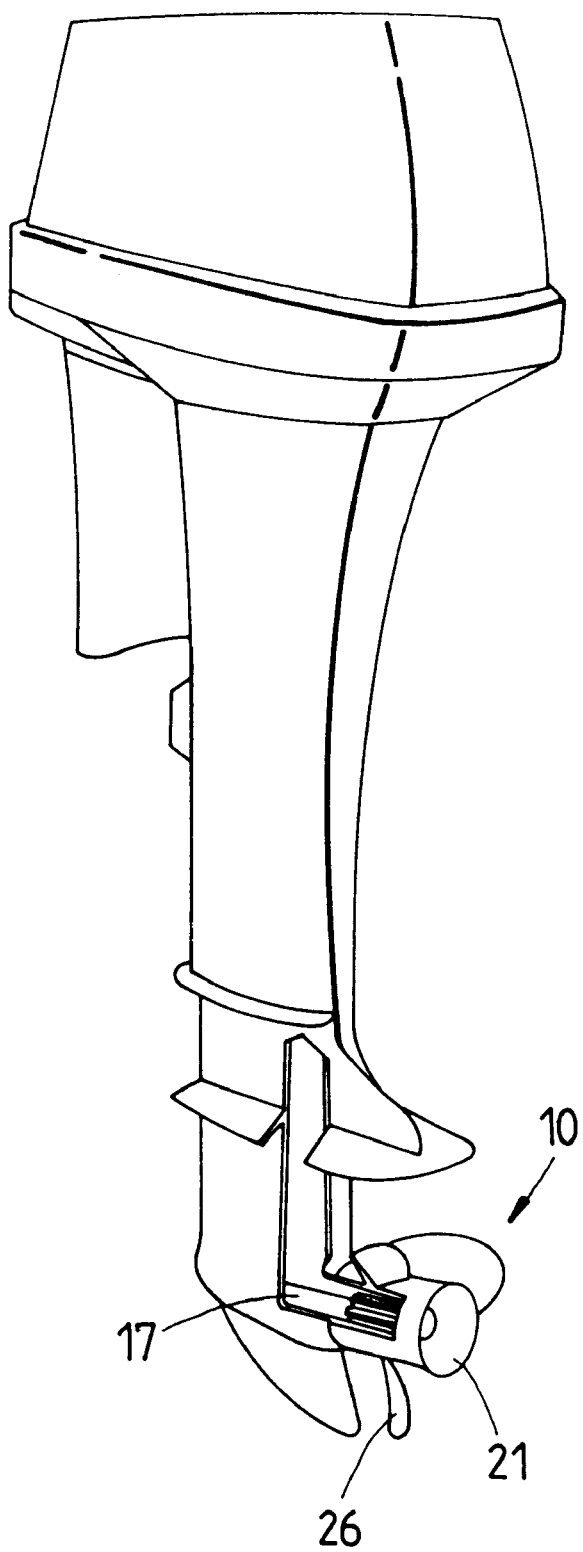
FIG. 1 shows a perspective view of a first preferred embodiment of the present invention.
Figure 2:
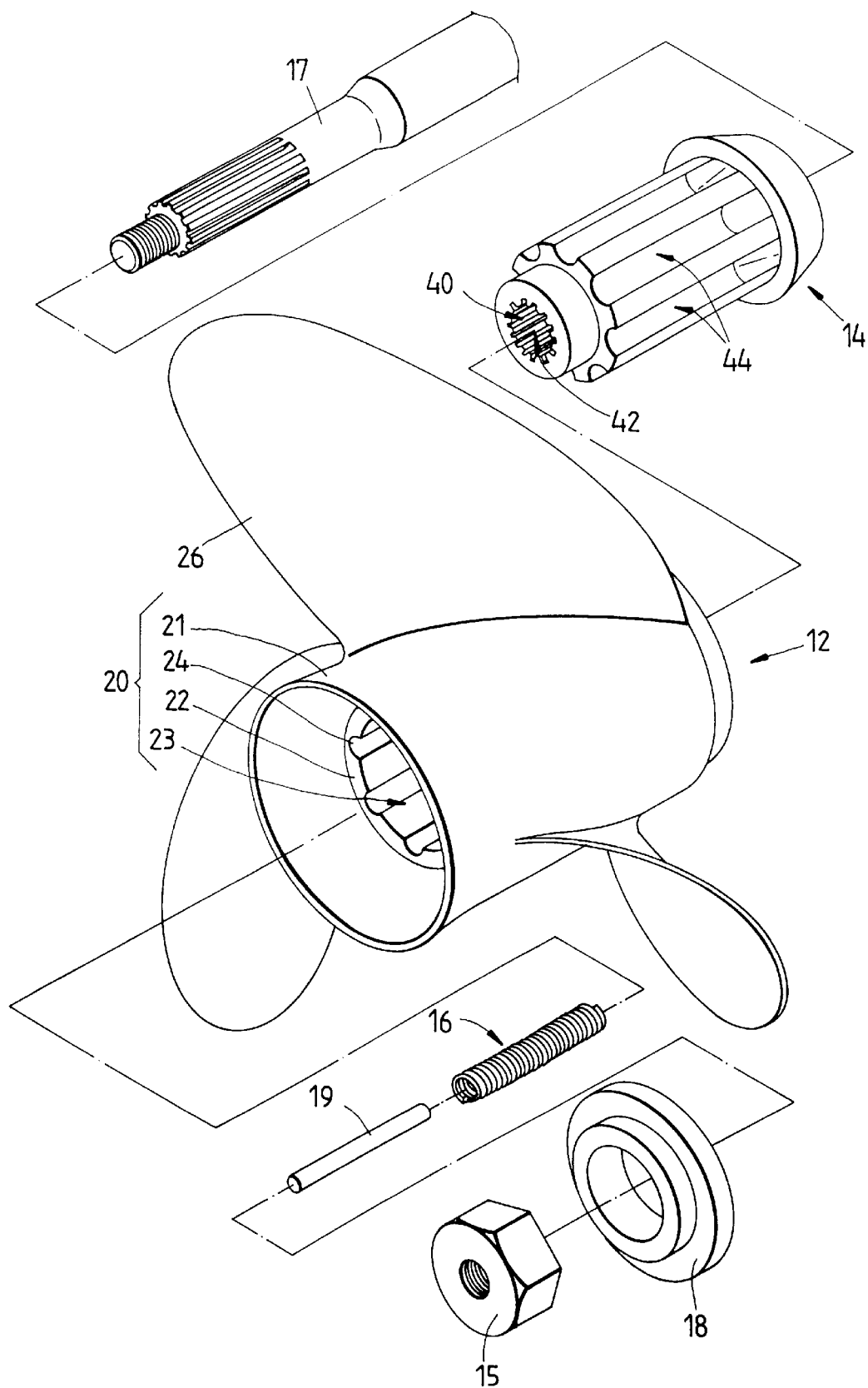
FIG. 2 shows an exploded view of the first preferred embodiment of the present invention.
Figure 3:
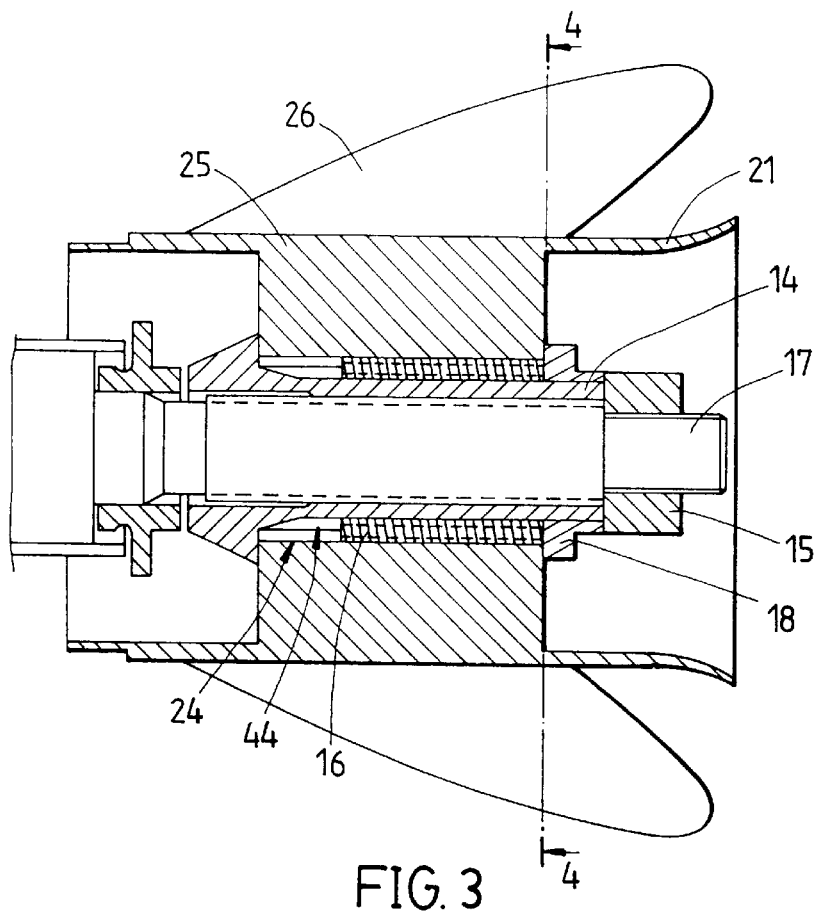
FIG. 3 shows a sectional view of the first preferred embodiment of the present invention.
Figure 4:
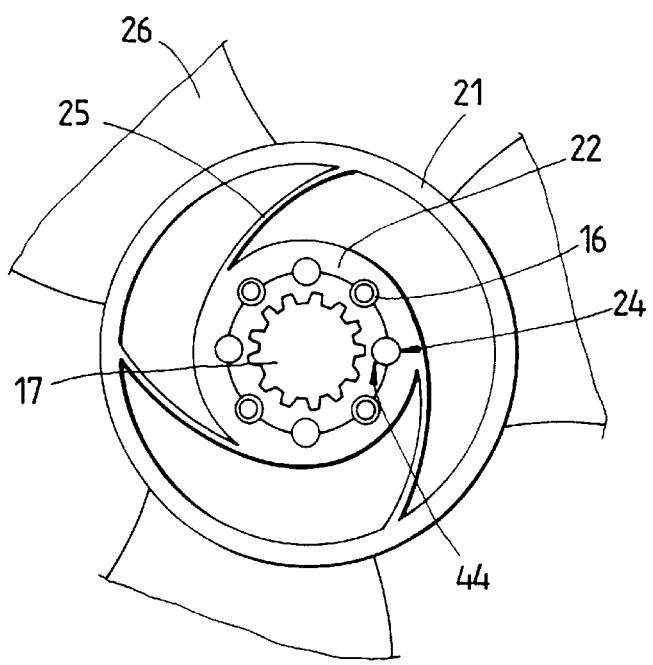
FIG. 4 shows a sectional view of a portion taken in the direction indicated by a line 4—4 as shown in FIG. 3.

As shown in FIGS. 1–5, a propeller 10 embodied in the present invention is composed of a propelling unit 12, a driving unit 14, and a plurality of transmission units 16 located between the propelling unit 12 and the driving unit 14.

The propelling unit 12 has an axial portion 20 and three helical blades 26 made integrally with the axial portion 20 such that the blades 26 are separated from one another in an equiangular manner. The axial portion 20 has an outer hub 21 of a cylindrical construction for mounting thereon the blades 26, and an inner hub 22 of a cylindrical construction and located in the outer hub 21. The inner hub 22 has a first axial hole 23 coaxial with the outer hub 21. The first axial hole 23 is provided in the inner wall thereof with eight first retaining slots 24 extending along the direction of the longitudinal axis of the first axial hole 23 such that they are equiangularly separated from one another. Located between the outer wall of the inner hub 22 and the inner wall of the outer hub 21 are three ribs 25 which are equiangularly separated from one another.

The driving unit 14 is tubular in shape and located in the inner hub 22. The driving unit 14 has a second axial hole 40 which is provided in the inner wall thereof with a plurality of racks 42 extending in the direction of the longitudinal axis of the second axial hole 40. The second axial hole 40 is further provided in the outer wall thereof with eight second retaining slots 44 extending in the direction of the longitudinal axis of the second axial hole 40 such that the second retaining slots 44 are opposite in location to one another. The second retaining slots 44 are similar in a cross-sectional shape to the first retaining slots 24. The cross-sectional shape may be semicircular, arcuate, or rectangular.

The transmission units 16 are tubular in shape and are made integrally of an expandable metal material having an appropriate rigidity. The transmission units 16 are circular in their cross section. The transmission units 16 may be made of an elongated metal material having a round or rectangular cross section by a helical extension along the direction of the longitudinal axis of the material at a relatively small pitch.

The driving unit 14 is first joined with a drive shaft 17 of an engine (not shown in the drawing) and is then fitted into the inner hub 22 of the propelling unit 14. Thereafter, four transmission units 16 are located between the first retaining slots 24 and the second retaining slots 44. The inner hub 22 and the transmission units 16 are pressed against by a stop piece 18 and fastened by a nut 15 engaging the drive shaft 17. The driving unit 14 is driven by the drive shaft 17 to rotate at a high speed, so as to force the propelling unit 12 to rotate to generate the backward thrust of water to propel the boat.

Figure 5:
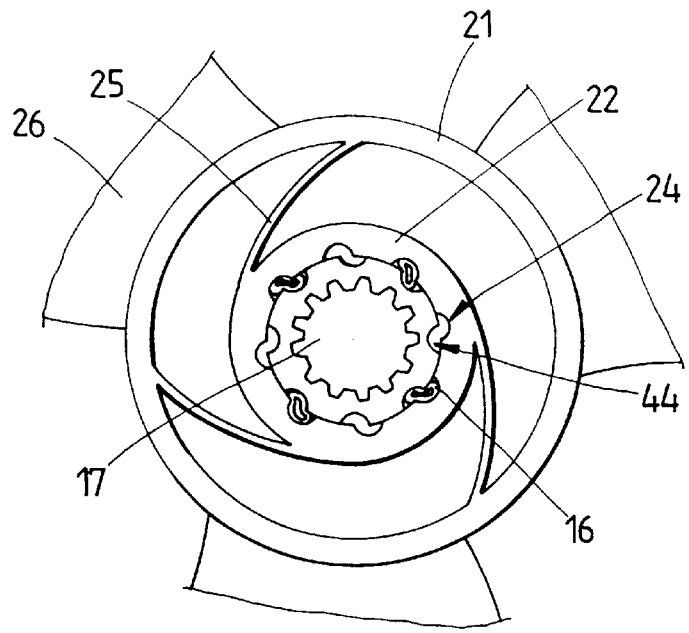
FIG. 5 shows a sectional schematic view of the present invention at work.

As shown in FIG. 5, each of the transmission units 16 is exerted on by a shearing force at the moment when the blades 26 of the propeller 10 are impacted on by a hard object present in the water in which the propeller 10 works. The shearing force may be so destructive that the transmission units 16 are caused to collapse. Such a structural breakdown of the transmission units 16 serves to safeguard the structural integrity of the blades 26 and the driving shaft 17. The transmission units 16 are capable of such a protective deed as described above in view of the fact that the transmission units 16 are of a tubular construction capable of absorbing an impact force at the time of destruction of the tubular construction by the impact force.

In fact, the transmission units 16 have operational advantages in that they are expandable, and that they are deformed by the impact force exerting thereon without being severed outright, and further that the original opposite arrangement of the first retaining slots 24 and the second retaining slots 44 is changed slightly to an alternate arrangement in the course of impact, thereby causing the deformed transmission units 16 to remain in the retaining slots 24 and 44 so as to enable the propelling unit 12 and the driving unit 14 to operate normally.

If the transmission units 16 are of a helical tubular construction, their diameter is first shortened when they are deformed by a force exerting thereon in a direction perpendicular to their axis. However, such helical and tubular transmission units 16 are capable of recovering their original form upon being relieved of a force exerting thereon, provided that the force in question is not so excessive as to cause a permanent deformation of the transmission units 16. As a result, the propeller 10 of the present invention is relatively less vulnerable to destruction. Moreover, the helical transmission units 16 of the present invention may be provided respectively with a rod-shaped bracing unit 19, which is inserted thereinto so as to facilitate the implanting of the transmission units 16 in the first retaining slots 24 and the second retaining slots 44.

Figure 6:
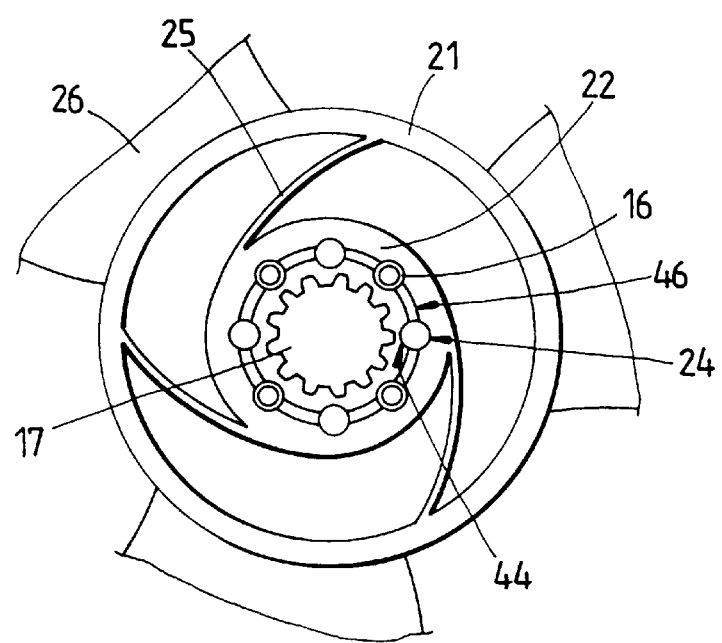
FIG. 6 shows a sectional view of a second preferred embodiment of the present invention.

As shown in FIG. 6, the driving unit 14 has an outer diameter smaller than the inner diameter of the first axial hole 23. For this reason, a ring-shaped interstice 46 is formed between the outer wall surface of the driving unit 14 and the inner wall surface of the first axial hole 23 when the driving unit 14 is located in the center of the inner hub 22. The ring-shaped interstice 46 serves to provide the transmission units 16 an extra space which may be needed to accommodate the deformation of the transmission units 16 for enhancing the impact-absorbing effect of the transmission units 16.

What is claimed is:

1. A propeller comprising:

a propelling unit composed of an axial portion and a plurality of helical blades fastened with said axial portion, said axial portion consisting of an outer hub of a cylindrical construction and an inner hub located in said outer hub such that a first axial hole of said inner hub is coaxial with said outer hub, said first axial hole provided in an inner wall thereof with a plurality of first retaining slots extending along the direction of a longitudinal axis of said first axial hole, and first retaining slots being spaced apart and around the circumference of said first axial hole, said axial portion further consisting of a plurality of ribs made integrally therewith;

a driving unit located in said first axial hole and provided in an outer wall thereof with a plurality of second retaining slots extending along the direction of a longitudinal axis of said driving unit, said second retaining slots being spaced apart and around the circumference of said outer walls so as to correspond with said first retaining slots; and at least one expandable metal transmission unit located between said inner hub and said driving unit such that said transmission unit engages one of said first retaining slots and one of said second retaining slots;

wherein said transmission unit is tubular in shape and capable of permanent deformation at such time when said transmission unit is exerted on by a force on said transmission unit.

2. The propeller as defined in claim 1, wherein said transmission unit is a spiral tube having a pitch.

3. The propeller as defined in claim 1, wherein said driving unit has a diameter smaller than a diameter of said first axial hole such that said driving unit and an inner wall surface of said first axial hole are spaced apart so as to be out of engagement and form a ring-shaped shape therebetween, partially filled by said transmission unit.

4. The propeller as defined in claim 2, wherein said transmission unit is provided with at least one bracing unit which is implanted in said transmission unit.

5. The propeller as defined in claim 4, wherein said bracing unit is rod-shaped.

6. A propeller comprising:

a propelling unit composed of an axial portion and a plurality of helical blades fastened with said axial portion, said axial portion consisting of an outer hub of a cylindrical construction and an inner hub located in said outer hub such that a first axial hole of said inner hub is coaxial with said outer hub, said first axial hole provided in an inner wall thereof with a plurality of first retaining slots extending along the direction of a longitudinal axis of said first axial hole, and first retaining slots being spaced apart and around the circumference of said first axial hole, said axial portion further consisting of a plurality of ribs made integrally therewith;

a driving unit located in said first axial hole and provided in an outer wall thereof with a plurality of second retaining slots extending along the direction of a longitudinal axis of said driving unit, said second retaining slots being spaced apart and around the circumference of said outer walls so as to correspond with said first retaining slots; and at least one expandable metal transmission unit located between said inner hub and said driving unit such that said transmission unit engages one of said first retaining slots and one of said second retaining slots;

wherein said transmission unit is tubular in shape and capable of permanent deformation at such time when said transmission unit is exerted on by a force on said transmission unit;

wherein said transmission unit is a spiral tube having a pitch.

7. The propeller as defined in claim 6, wherein said driving unit has a diameter smaller than a diameter of said first axial hole such that said driving unit and an inner wall surface of said first axial hole are spaced apart so as to be out of engagement and form a ring-shaped shape therebetween, partially filled by said transmission unit.

8. The propeller as defined in claim 6, wherein said transmission unit is provided with at least one bracing unit which is implanted in said transmission unit.

9. The propeller as defined in claim 8, wherein said bracing unit is rod-shaped.

* * * * *